(12) United States Patent
Standen et al.

(10) Patent No.: US 6,315,420 B1
(45) Date of Patent: Nov. 13, 2001

(54) REAR-VIEW MIRROR APPARATUS FOR A ROAD VEHICLE

(76) Inventors: John Paul Standen, 39 Fraser Close, Daventry, Northants NN11 5HD; Christopher Allan Standen, 39 Kenilworth Avenue, Harold Park, Romford, Essex RM3 9NE, both of (GB)

( * ) Notice: Subject to any disclaimer, the term of this patent is extended or adjusted under 35 U.S.C. 154(b) by 0 days.

(21) Appl. No.: 09/571,878

(22) Filed: May 5, 2000

(30) Foreign Application Priority Data

Nov. 8, 1997 (GB) .................................................. 9723569

(51) Int. Cl.⁷ .................................................... G02B 7/182
(52) U.S. Cl. .......................... 359/871; 359/872; 359/877; 359/876
(58) Field of Search ..................................... 359/871, 872, 359/877, 876; 368/22, 21, 69–70, 80, 185; 310/49 R, 82, 83

(56) References Cited

U.S. PATENT DOCUMENTS

Re. 29,411 * 9/1977 Newell ................................ 310/49 R
5,636,184 * 6/1997 Boyd ...................................... 368/22

* cited by examiner

Primary Examiner—Mohammad Sikder
(74) Attorney, Agent, or Firm—Robert F. Delbridge

(57) ABSTRACT

An adjustable rear-view mirror apparatus for a road vehicle has a drive for rotating the mirror to an angle determined by a control signal thereto. The drive includes an output gear driven by a drive gear rotated by a motor. A leaf spring carries the drive gear and biasses it into engagement with the output gear while allowing separation of the gears when a predetermined loading on the gears is exceeded.

6 Claims, 4 Drawing Sheets

REAR-VIEW MIRROR APPARATUS FOR A ROAD VEHICLE

FIELD OF THE INVENTION

This invention relates to a rear-view mirror apparatus for a road vehicle. The apparatus positions the mirror according to a control signal.

BACKGROUND OF THE INVENTION

In our earlier UK Patent No 2 259 064, we disclosed and claimed apparatus in which the position of a rear-view mirror was controlled according to the angle between the tractor and the trailer so that the driver can always see, using the mirror, along the side of the trailer on the inside of the turn. This was done by sensing the rotation of the trailer relative to the tractor in an articulated road vehicle. Each mirror was provided with a drive means comprising an arcuate gear member driven by a worm gear rotated by an electric motor, a potentiometer serving to provide an electrical signal indicative of the angular position of the mirror.

A problem with constructing such an arrangement is that of eliminating backlash in the gears without making the cost excessive. It is also desirable to be able to allow for impact to deflect the mirror without damaging it, and to permit rapid restoration of the desired alignment of the deflected mirror.

The present invention seeks to overcome these problems.

SUMMARY OF THE INVENTION

According to the invention, there is provided an adjustable rear-view mirror apparatus for a road vehicle, the mirror having drive means for rotating the mirror to an angle determined by a control signal thereto, the drive means comprising an output gear driven by a drive gear rotated by a motor, the motor and the drive gear being mounted in such a manner as to bias the drive gear into engagement with the output gear while allowing separation of the gears when a predetermined loading on the gears is exceeded.

The drive gear, which is suitably a worm gear, is preferably carried by a leaf spring. The mirror apparatus preferably comprises electronic circuit means for receiving the control signal and for controlling operation of the motor to position the mirror, the electronic circuit means being mounted on a resiliently flexible circuit board which also serves as the leaf spring.

The output gear is suitably an arcuate gear member, for example of 180° of arc.

The circuit board is suitably of the commonly-available type manufactured from glass-reinforced resin.

The mirror is suitably mounted on a rigid chassis attachable to the vehicle, the circuit board being fixed to the chassis at one end thereof, and additionally clamped to the chassis at a position intermediate the ends of the board according to the force required between the gears. The position will depend on the nature and thickness of the board, and in particular its resilience or springiness.

The arrangement of this aspect of the invention permits compactness and simplicity of construction, while permitting the mirror to move quickly out of position, for example in the event of an impact, without damage to the mirror or to the drive mechanism.

According to another aspect of the invention, there is provided an automatically-adjustable rear-view mirror apparatus for a road vehicle, the apparatus having drive means for rotating the mirror to an angle determined by a control signal thereto, and control means for receiving the control signal and for controlling operation of the motor to position the mirror, the control means comprising means for signalling the current angular position of the mirror, means for signalling the current velocity of the mirror or the motor, means for comparing the current angular position of the mirror with the desired position determined by the control signal and for determining therefrom the direction and speed required to move the mirror to its desired position, means for comparing the velocity so determined with the current velocity to produce a velocity error value, and means for adjusting the motor speed according to the error value.

The invention also provides a method of adjusting the position of a rear-view mirror for a road vehicle, the mirror having drive means for rotating the mirror to a desired angular position determined by a control signal thereto, the method comprising measuring the current angular position of the mirror and determining from the difference between the measured position and the desired position the direction and speed required to move the mirror to its desired position, determining the current speed of the mirror and adjusting the mirror speed according to the difference between the current speed and the required speed.

The desired speed may be determined by means of stored data in the form of look-up tables, in which speed values are stored against angular error values. The adjustment of speed may also be carried out on the basis of stored look-up table determining the change of power supplied to the motor on the basis of the error from the desired speed. Alternatively, the motor may be supplied with power on a pulse width modulation basis, the relative width of the power pulses being varied according to the error, either on a linear relationship, or by means of look-up table values. The motor can also be controlled to brake the motion of the mirror.

Controlling the speed of rotation of the mirror according to the error from the calculated speed permits the device to use a simple electric motor to drive the mirror instead of the more costly stepper motors and the like, while still permiting accurate positioning with smooth adjustment, rather than rapid abrupt movements which make use of the mirror difficult.

The invention is applicable to the positioning of mirrors controlled by joystick or similar controls, or to automadcally-rotated mirrors for use with articulated road vehicles, for example as described in our Patent No. GB2 259 064.

In yet another aspect of the invention, there is provided a device for providing an electrical signal indicating the relative angle between the tractor and trailer of an articulated road vehicle, the device comprising a roller mounted in or adjacent to the fifth wheel plate on the tractor in such a position as to be rotated by a trailer when coupled to the tractor, the roller driving signalling means providing a signal in response to rotation of the roller.

The signalling means may be a simple switch providing a pulse signal as the roller rotates. The switch may be a mechanical contact, an opto-electronic device, a magnetic device or any other means signalling rotations digitally. Alternatively, the roller may be arranged to drive, for example through suitable gearing, a device such as a potentiometer giving a continuously changing signal as the roller rotates.

The output from the device can be used to provide information about the relative angle of the trailer to the tractor, for example for use in the device according to the other aspects of the invention, where the angle of the rear-view mirror on the tractor can be varied according to the turning of the tractor relative to the trailer to permit the driver in the tractor to continue to be able to see the rear end of the trailer as he or she turns around corners. It will be appreciated that, because the angle given by the device cannot be absolute, as it depends on the orientation of the tractor during coupling to the trailer, it will be necessary to provide some form of calibration for use by the driver before beginning a journey. This may be done, for example, by simply pressing a calibration switch when the boiler appears to the driver to be aligned with the tractor.

The invention also provides a system for providing an electrical signal indicating the relative angle between the tractor and trailer of an articulated road vehicle, the system comprising two or more devices of the invention, spaced apart from each other, and means for processing the signals from all the devices to provide a single signal in which errors due to the effects of unwanted movement between the components of the fifth wheel arm minimised.

BRIEF DESCRIPTION OF THE DRAWINGS

In the drawings, which illustrate exemplary embodiments of the invention.

DETAILED DESCRIPTION OF THE ILLUSTRATED EMBODIMENTS

Figure 1:
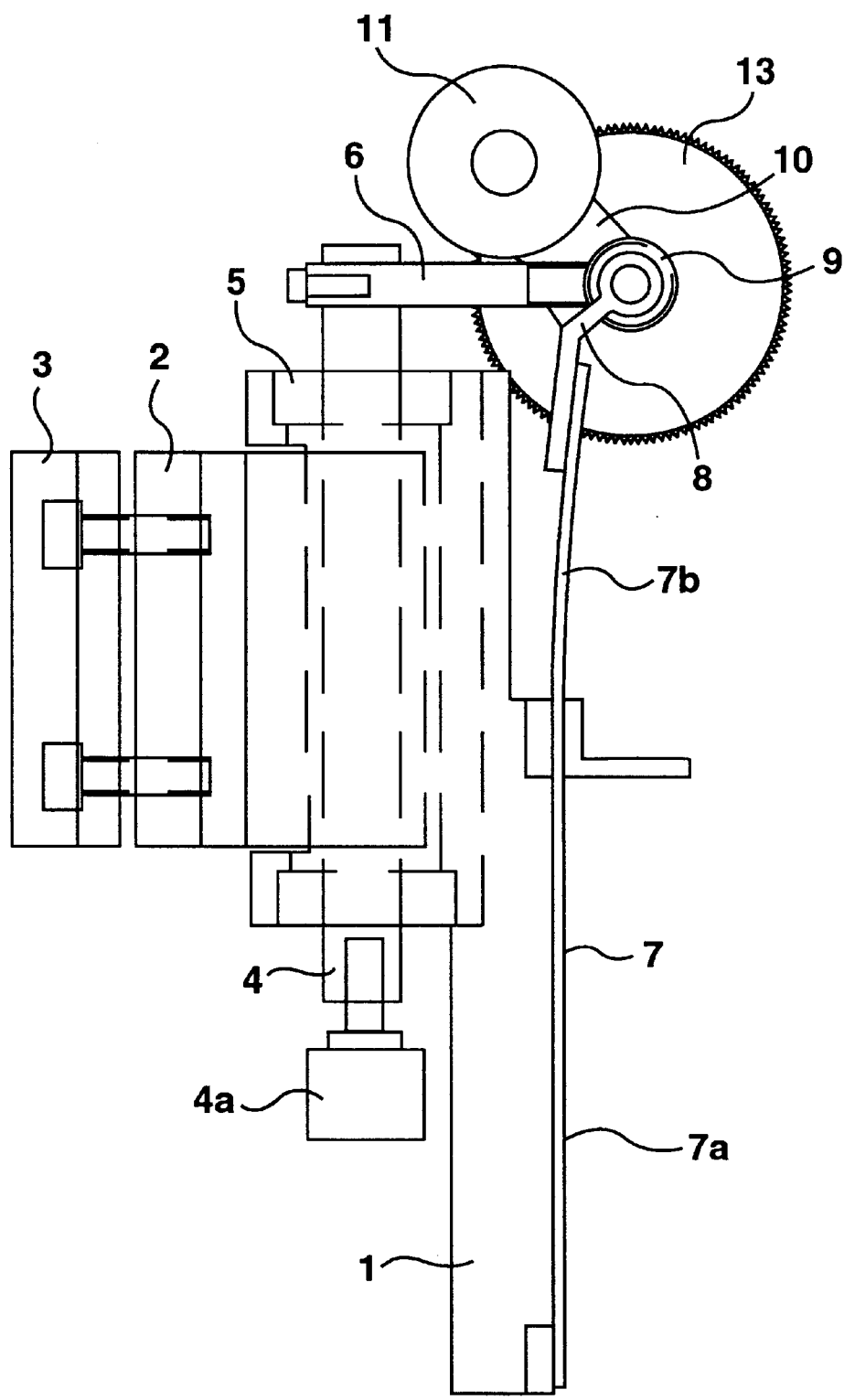
FIG. 1 is a side elevation of the mirror drive unit according to one aspect of the invention.
Figure 2:
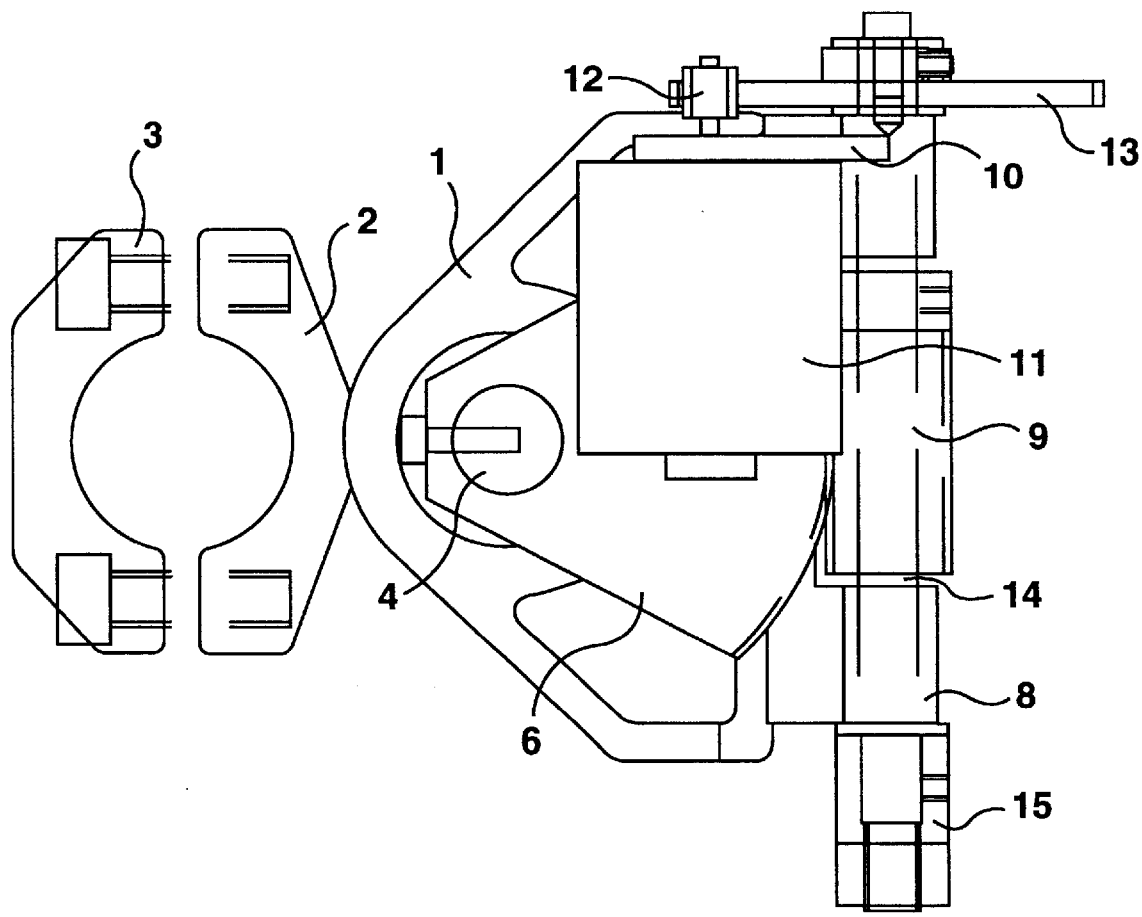
FIG. 2 is a top plan view of the drive unit of FIG. 1.

Referring first to FIGS. 1 and 2, the mirror drive unit comprises a chassis 1 which is carried by a bracket 2 which has a clamp 3 for attachment to a suitable component of the vehicle, for example a mirror mounting bracket attached to the door of the tractor. A shaft 4 is mounted an the bracket 2, and the chassis 1 is mounted for rotation about the shaft 4 by way of bearings 5. The mirror (not shown) is carried on the chassis. The shaft 4 has at is lower end a potentiometer 4a giving an electrical signal corresponding to the angular position of the chassis (and hence that of the mirror) relative to the shaft, and at its upper end a worm wheel 6, which is in the form of a segment of a circle, since the range of movement of the mirror is limited.

The chassis has mounted thereon a printed circuit board 7 carrying at one end 7a the electronic control components described hereinafter with reference to FIGS. 3 and 4. This end 7a of the board is firmly attached to the chassis 1. The other end portion 7b of the printed circuit board, which is suitably of the glass-fibre reinforced plastics type, is free of electronic components and projects free of the chassis mounting. A worm carrier 8 is attached to the end of the portion 7b and is in the form of a fork carrying the worm gear 9 between its two arms, the worm gear 9 meshing with the worm wheel 6. One arm of the forked worm carrier 8 mounts a bracket 10 supporting an electric motor 11. The motor 11 has a pinion 12 on its shaft which meshes with a spur gear 13 mounted on a common axle 14 with the worm gear 9, so that rotation of the motor shaft turns the worm gear 9, driving it round the worm wheel 6, and thereby rotating the chassis and with it the mirror. The opposite end of the axle 14 carries an adjuster 15 (FIG. 2) which serves to remove end float on the axle. The adjuster is screw-threaded on to the axle and includes a grub screw ending transversely through it to lock it in position when rotation on the screw thread has eliminated the end float.

The springiness of the printed circuit board 7 is such as to hold the worm gear firmly in contact with the worm wheel, thus avoiding backlash, but permitting the worm gear and worm wheel to jump apart if an excessive load is placed on the mirror, for example as a result of the mirror striking another object, allowing the chassis and mirror to rotate freely to a position where it can escape damage. On the other hand, the lateral stiffness of the board 7 (or other sprung plate) resists longitudinal movement of the worm gear, which would have an adverse effect on the accuracy of positioning of the mirror, equivalent to backlash in the gear mechanism.

The potentiometer serves to provide information relating to the position of the mirror which is used in the control means described hereinafter with reference to FIGS. 3 and 4.

Figure 3:
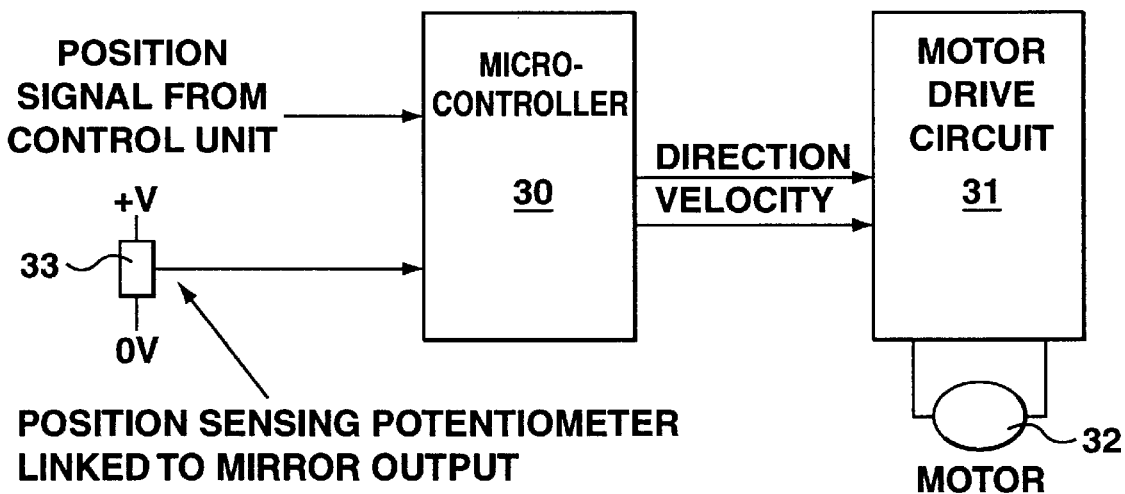
FIG. 3 is a diagram of the motor control means.

Referring now to FIG. 3, the control of the motor is in two stages. A microcontroller 30 receives a position signal from the mirror control unit. This in turn has received information relating to the angular position of the trailer relative to the tractor and has calculated the desired angular position of the mirror on each side of the tractor (as appropriate). The microcontroller 30 determines the direction and velocity of the mirror movement required and sends control signals to the motor drive circuit 31 accordingly. The motor drive circuit 31 then controls operation of the motor 32 according to these control signals.

A position sensing potentiometer 33 (or shaft encoder or other device giving a signal in proportion to the rotation of the chassis 1 relative to the shaft 4) provides a mirror position signal to the microcontroller 30.

Figure 4:
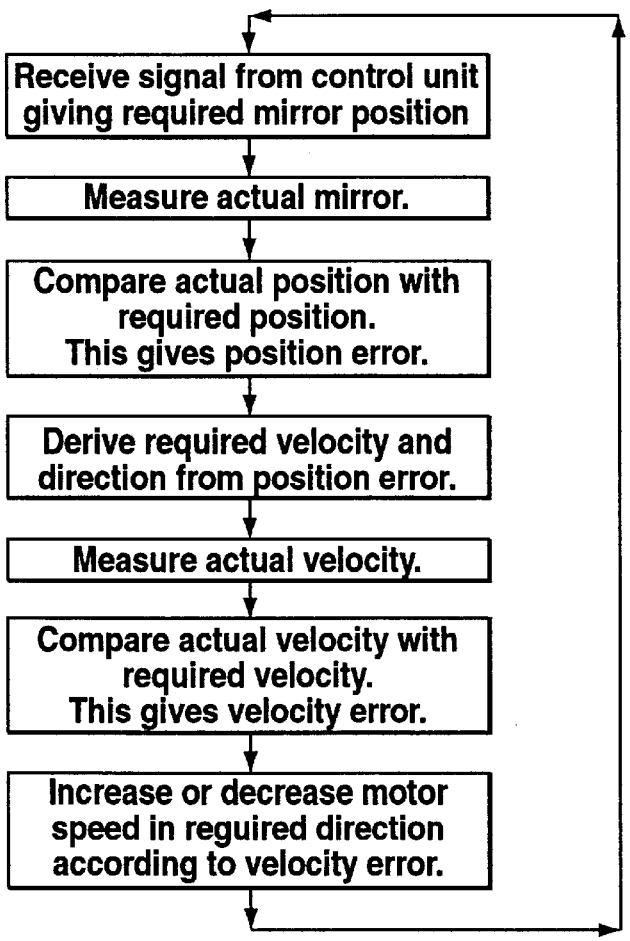
FIG. 4 is a flow diagram illustrating the operation of the control means.

FIG. 4 shows the operation of the control of the motor. The microcontroller first receives the signal from the control unit giving the required position of the mirror. The actual position of the mirror is then determined by the signal from the potentiometer 33, and this is compared with the required position to give a position error value. This value is then used to derive the required direction and instantaneous velocity of the mirror from a look-up table held in a read only memory, for example a programmable read only memory (PROM). The current velocity of the mirror is determined either from the rate of change of position measured over a predetermined period, or from a suitable detector on the motor shaft, and this is compared with the derived velocity to give a velocity error. This error value is used to adjust the speed of the motor, either by means of a direct linear relationship, or by means of a second look-up table in PROM or the like, to give the necessary power output to the motor. This could be achieved by means of pulse-width modulation, the took-up table giving the necessary pulse widths to supply to the motor to achieve the desired speed, or by incrementing or decrementing the pulse width according to the velocity error, thereby providing simple feedback loop control. The cycle is repeated continuously until the positional error is zero, indicating that the mirror has reached the desired position. As the positional error approaches zero, the motor speed 15 desirably reduced gradually so that the mirror moves fast when the angular error is large, but more gently when the error is only small, thereby ensuring that the mirror motion is smooth, rather than jerky, especially when the angle between the trailer and the tractor is varying more slowly.

Figure 5:
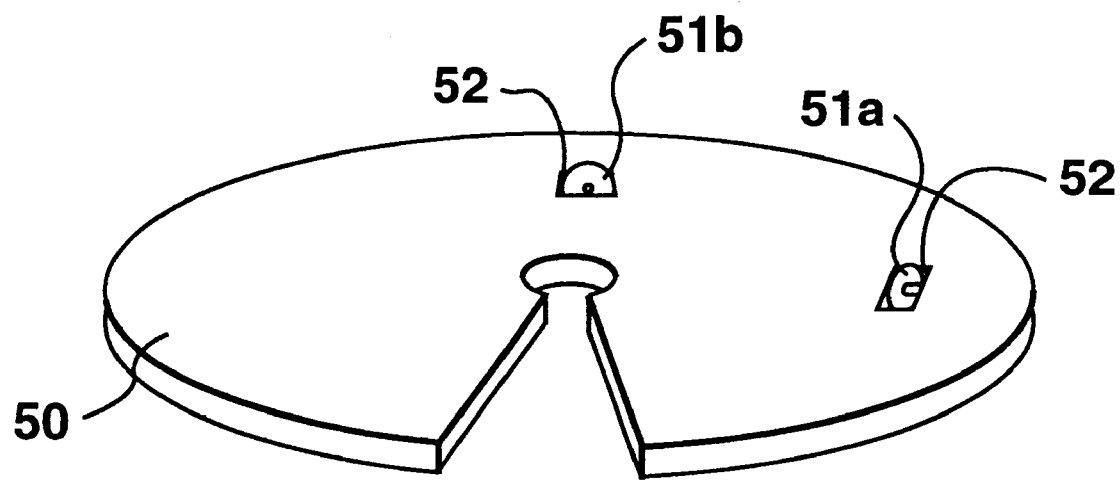
FIG. 5 is a diagrammatic perspective view of a tractor fifth wheel coupling for an articulated vehicle mounting devices for detecting the angle between the tractor and trailer.

Referring now to FIG. 5, the upper plate 50 of the tractor's fifth wheel coupling for an articulated tractor and trailer combination is illustrated. To accommodate two angle sensors 51 slots 52 are cut through the plate 50 on a centre line at right angles to the fore and aft direction of the trailer and on the central longitudinal axis at 90° to it. The axis of rotation of each sensor is directed towards the centre of the plate 50.

Figure 6:
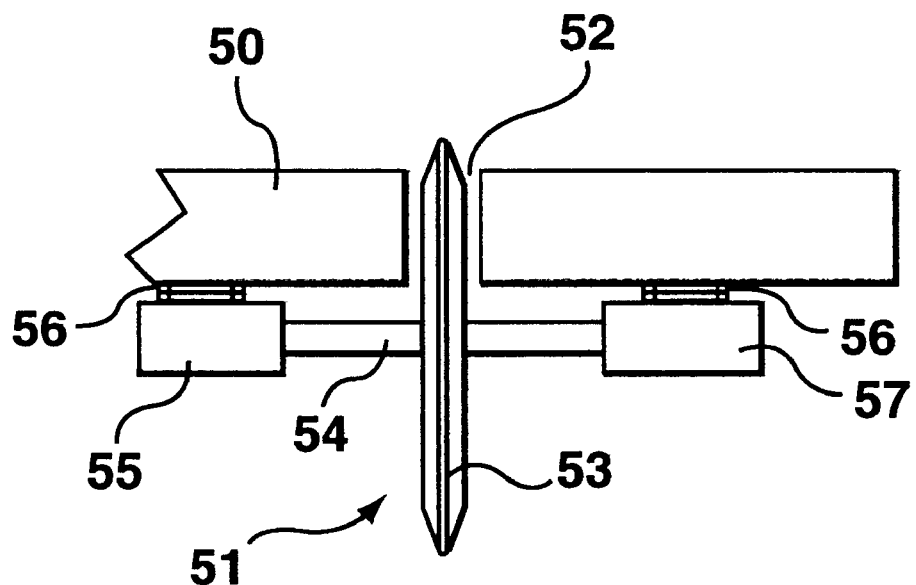
FIG. 6 is an enlarged part-sectional side elevation of the section of the fifth wheel with one of the detecting devices.

The construction of each sensor 51 can be seen more clearly from FIG. 6, comprising a wheel 53 mounted on a shaft 54 carried by a mounting bearing 55 which is in turn attached to the underside of the plate 50 by a spring arrangements 56, so that the wheel can retract as the trailer is coupled or decoupled, but which ensures a constant pressure of the wheel 53 against the tailer as it rotates in use. It will be appreciated that FIG. 6 is diagrammatic; various different sprung mountings for the mounting bearing 55 can be employed, including leaf springs and two sets of coil springs. The wheel 53 is formed with a pointed edge which may be roughened or serrated to ensure chat it can cut through any grease or dirt and therefore deliver an accurate position reference signal at all times. The shaft 54 mounts a shaft encoder device 57 which delivers a pulse signal indicating speed and direction of rotation of the wheel 53 and thus rotation of the trailer relative to the tractor. The signal does not, of course, give absolute position, so it may be necessary for the driver to calibrate the system, for example by pressing a button in the cab when he judges the tractor and trailer to be correctly aligned. Alternatively, the control device may be programmed to zero the mirror control when it has received no significant output from the sensor for a predetermined period of time while the vehicle is moving.

Although a single sensor could be used, errors might be experienced as a result of sideways movement of the trailer part of the coupling relative to the tractor part because of the wide constructional tolerances and wear arising in use. This may result in the distance of the sensor from the centre of the trailer pivot point varying, and thus the positional information being erroneous. To overcome this, periodic re-zeroing of the system might be needed. In the illustrated embodiment, however, two sensors 51 are fitted. one 51a at one side of the centre of the fifth wheel and the other 51b on the central fore and aft axis of the fifth wheel plate but at the same distance from the centre of the plate. The side sensor 51a measures trailer movement in the front/rear direction, while the other sensor 51b measures sideways movement of the trailer. Thus, purely rotational movement with no bearing play in the coupling will cause both sensors to rotate through equal angles. Bearing play with no trailer rotation will cause just one sensor to rotate. A combination of rotational movement and bearing play will cause both sensors to rotate, but by different amounts. Signal processing means will then use the outputs from the two sensors to give a value in which the errors cancel each other. For example, when the trailer turns and then straightens, if the king pin moves within the bearing, the sensors will not return to their original positions. If the distance between the sensors and the pivot are known, the error on each sensor can be calculated. Alternatively, it may be possible to deduce when the trailer is in a straight line with the tractor and to re-zero the sensors at this stage.

Where the sensor is installed at a position which is not at 90° to the fore-and-aft axis of the vehicle, the wheel will need to be of a conical cross-section to avoid the risk of damage as the trailer is coupled or decoupled.

The or each sensor may be mounted outside the fifth wheel assembly, avoiding the need to modify he fifth wheel. This is applicable where a sufficiently large flat surface is available on the underside of the trailer, and would permit easy fitting to existing tractor/trailer combinations. For example, it may be convenient to form the sensors as units which can be clamped on to the edge or rim of the fifth wheel.

It will be appreciated that, while FIG. 5 shows the use of two sensors, a single sensor might be used, or more than two sensors.

What is claimed is:

1. An adjustable rear-view mirror apparatus for a road vehicle, the mirror having drive means for rotating the mirror to an angle determined by a control signal thereto, the drive means comprising an output gear driven by a drive gear rotated by a motor, and a leaf spring carrying the drive gear and biassing the drive gear into engagement with the output gear while allowing separation of the gears when a predetermined loading on the gears is exceeded.

2. Apparatus according to claim 1, wherein the drive gear is carried by a gear.

3. Apparatus according to claim 1, wherein the output gear is an arcuate gear.

4. Apparatus according claim 1 comprising electronic circuit means for receiving the control signal and for controlling operation of motor to position the mirror, the electronic circuit means being mounted on a resiliently flexible circuit board which also serves as the leaf spring.

5. Apparatus according to claim 4, wherein the circuit board is of the type manufactured from glass-reinforced resin.

6. Apparatus according to claim 4, wherein the mirror is mounted on a rigid chassis attachable to the vehicle, the circuit board being fixed to the chassis at one end thereof, and additionally clamped to the chassis at a position intermediate the ends of the board according to the force required between the gears.

* * * * *